United States Patent [19]

Dietlein et al.

[11] Patent Number: 4,978,706
[45] Date of Patent: Dec. 18, 1990

[54] SILICONE SEALANTS

[75] Inventors: John E. Dietlein, Elizabethtown, Ky.; Russell P. Kamis, Midland; Jerome M. Klosowski, Bay City, both of Mich.

[73] Assignee: Dow Corning Corporation, Midland, Mich.

[21] Appl. No.: 399,103

[22] Filed: Aug. 28, 1989

[51] Int. Cl.$^5$ ................................................ C08K 3/30
[52] U.S. Cl. ..................................... 524/423; 524/425; 524/435; 524/437; 524/448; 524/431; 524/779; 524/785; 524/788; 524/783; 524/786; 524/864; 524/789; 528/33; 528/34; 528/901
[58] Field of Search ........................... 528/34, 33, 901; 524/425, 435, 437, 448, 431, 423, 779, 785, 788, 783, 786, 864, 789

[56] References Cited

U.S. PATENT DOCUMENTS

| | | | |
|---|---|---|---|
| 3,189,576 | 9/1965 | Sweet | 260/46.5 |
| 3,284,485 | 8/1966 | Gossens | 260/46.5 |
| 3,776,933 | 7/1973 | Toporcer et al. | 260/448.2 |
| 3,817,909 | 10/1974 | Toporcer et al. | 260/375 B |
| 4,400,527 | 11/1983 | Mathew | 556/422 |
| 4,503,210 | 4/1985 | Von Au | 528/33 |
| 4,720,530 | 1/1988 | Wurminghausen et al. | 528/34 |
| 4,810,748 | 7/1989 | Spells | 524/725 |
| 4,870,130 | 9/1989 | Achtenberg et al. | 528/34 |

Primary Examiner—Melvyn I. Marquis
Attorney, Agent, or Firm—Edward C. Elliott

[57] ABSTRACT

A silicone composition which is stable in the absence of moisture, but cures to an elastomer upon exposure to moisture consists essentially of a hydroxyl endblocked polydiorganosiloxane; a difunctionalsilane having acetamido, urea, or urethane functional groups; and a tetrafunctionalsilane having oximino functional groups. A composition containing 100 parts by weight of the polydiorganosiloxane, from 0.1 to 7 parts by weight of difunctionalsilane, from 0.1 to 7 parts by weight of tetrafunctionalsilane, and a ratio of difunctionalsilane to tetrafunctionalsilane of from 0.1 to 3, and optional filler is useful as a sealant or adhesive, having an improved skin over time.

14 Claims, No Drawings

SILICONE SEALANTS

BACKGROUND OF THE INVENTION

1. Field of the Invention

This invention relates to silicone sealants which cure upon exposure to moisture.

2. Background Information

Silicone sealant compositions which cure upon exposure to moisture have been developed which make use of various cure mechanisms. One of these is a combination of hydroxyl endblocked polydiorganosiloxane acetamidosilane chain extender and aminoxysilicon crosslinking system. Such a system is used in U.S. Pat. No. 4,810,748, issued Mar. 7, 1989.

U.S. Pat. No. 3,817,909. issued June 18, 1974, teaches a low modulus room temperature vulcanizable silicone elastomer obtained by mixing a hydroxyl endblocked polydiorganosiloxane, filler, acetamido containing chain extender, and crosslinker which is an aminoxysilicon compound having 3 to 10 aminoxy groups per molecule.

Another cure mechanism makes use of silicon-bonded oxime radicals. U.S. Pat. No. 3,189,576, issued June 15, 1965, relates to organosilicon intermediates containing as functional groups silicon-bonded oxime radicals. Compounds containing an average of more than 2 oxime radicals per molecule are taught as useful as an intermediate in one-component room temperature curing coating and caulking compositions.

U.S. Pat. No. 4,503,210, issued Mar. 5, 1985, teaches oxime containing compositions which crosslink in the presence of moisture to form elastomers at room temperature. Compositions comprising a diorganopolysiloxane having terminal condensable groups and a silicon compound having at least three oxime groups per molecule bonded to silicon via oxygen are taught. A portion of the silicon compound is replaced by a mixture containing a silane having four oxime groups bonded to silicon via oxygen and a silane having a hydrocarbon radical bonded to a silicon atom via a SiC-bonding and having three oxime groups bonded to the silicon atom via oxygen.

SUMMARY OF THE INVENTION

A hydroxyl containing polydiorganosiloxane is cured through the use of a difunctional silane having acetamido, urea, or urethane functional groups and a tetra functional silane having oximino functional groups.

DESCRIPTION OF THE INVENTION

This invention relates to a silicone composition which is stable in the absence of moisture and which cures upon exposure to moisture to give an elastomer consisting essentially of the product obtained by mixing (A) 100 parts by weight of hydroxyl containing polyorganosiloxane having a viscosity of from 10 to 100 Pa.s at 25° C., the organo groups being selected from the group consisting of monovalent substituted or unsubstituted hydrocarbons having from 1 to 6 carbon atoms, (B) from 0.1 to 7 parts by weight of diacetamido functional silane of the formula

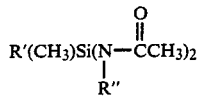

in which R' is an organic radical selected from the group consisting of methyl and vinyl and R" is an organic radical selected from the group consisting of methyl, ethyl, propyl, butyl, and phenyl, and (C) from 0.1 to 7 parts by weight of tetraoximino functional silane of the formula

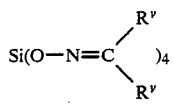

where $R^v$ is a radical selected from the group consisting of methyl, ethyl, propyl, butyl, phenyl, and hydrogen, the ratio of (B) to (C) being from 0.1 to 3.

This invention also relates to a silicone composition which is stable in the absence of moisture and which cures upon exposure to moisture to give an elastomer consisting essentially of the product obtained by mixing (A) 100 parts by weight of hydroxyl containing polydiorganosiloxane having a viscosity of from 10 to 100 Pa.s at 25° C., the organo groups being selected from the group consisting of monovalent substituted or unsubstituted hydrocarbons having from 1 to 6 carbon atoms, (B) from 0.1 to 7 parts by weight of difunctional silane of the formula

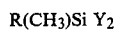

in which R is a monovalent substituted or unsubstituted hydrocarbon having from 1 to 6 carbon atoms, Y is selected from the group consisting of radicals of the formula

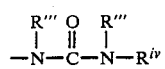

and of the formula

where R'" is an organic radical selected from the group consisting of methyl, ethyl, propyl, and butyl, and $R^{iv}$ is a radical selected from the group consisting of hydrogen, methyl, ethyl, propyl, butyl, and phenyl, and (C) from 0.1 to 7 parts by weight oi tetraoximino functional silane of the formula

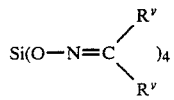

where $R^v$ is a radical selected from the group consisting of methyl, ethyl, propyl, butyl, phenyl, and hydrogen, the ratio of (B) to (C) being from 0.1 to 3.

The silicone composition cf this invention is of the type that is stable upon storage in the absence of moisture, but cures to an elastomer upon exposure to moisture. The uncured composition can vary in viscosity from a easily flowable fluid to a gum. The composition can include reinforcing and nonreinforcing fillers to produce compositions which are useful as sealants and adhesives.

The hydroxyl containing polydio:ganosiloxanes (A) can have a viscosity at 25° C. of from about 10 to 100 Pa.s, preferably from about 30 to 70 Pa.s when the composition will be compounded with filler and used as a sealant or adhesive. These polydiorganosiloxane can be monodispersed, polydispersed, or blends of varying viscosities as long as the average viscosity falls within the limits defined above. The hydroxyl containing polydiorganosiloxanes have organic groups selected from the group consisting of monovalent substituted or unsubstituted hydrocarbons having from 1 to 6 carbon atoms, such as methyl, ethyl, vinyl, phenyl and 3.3.3-trifluoropropyl radicals. The organic groups of the polydiorganosiloxane contain no more than 50 percent phenyl or 3,3,3-trifluoropropyl radicals and no more than 10 percent vinyl radicals based upon the total number of radicals in the polydiorgauosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane ethylmethylsiloxane, diphenylsiloxane, methylphenylsiloxane, methylvinylsiloxane, and 3,3,3-trifluoropropylmethylsiloxane, and any of these units where one of the organic groups is replaced with a hydroxyl group. The term polydiorganosiloxane as used herein does not preclude small amounts of other siloxane units such as an monoorganosiloxane units. The preferred hydroxyl containing polydiorganosiloxanes are hydroxyl endblocked polydiorganosiloxanes, which are known in the art and can be made by known commercial methods. The preferred hydroxyl endblocked polydiorganosiloxane is hydroxyl endblocked polydimethylsiloxane.

The difunctional silane (B) of the general formula

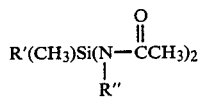

in which R' is an organic radical selected from the group consisting of methyl and vinyl and R" is an organic radical selected from the group consisting of methyl, ethyl, propyl, butyl, and phenyl, reacts with the hydroxyl endblocked polydiorganosiloxane to give a longer polymer. The longer polymer gives a tougher, lower modulus material that is ideal for this type of application. The silanes include, for example, methylvinyldi-(N-methylacetamido)silane, and methylvinyldi-(N-phenylacetamido)silane. A preferred difunctional silane (B) is methylvinyldi-(N-methylacetamido)silane. These acetamidosilanes can be prepared by reacting a chlorosilane with an alkali metal salt of an appropriate N-organoacetamide. This method is further detailed in U.S. Pat. No. 3,776,933, issued Dec. 4, 1973 by Toporcer and Crossan, and hereby incorporated by reference for the preparation of the acetamidosilanes.

The acetamidosilanes can be prepared as by the following illustration: mixing a sodium salt of N-methylacetamide with methylvinyldichlorosilane in an inert organic solvent such as toluene, filtering the by-produced sodium chloride from the toluene-product solution, and thereafter removing the toluene by vacuum distillation to obtain the product, methylvinyldi(N-methylacetamido)silane.

The diacetamido functional silane is used in an amount of from 0.1 to 7 parts by weight per 100 parts by weight of the hydroxyl containing polydiorganosiloxane (A). The preferred amount of the silane is from 1 to 3.5 parts by weight.

A longer polymer can also be formed through the use of from 0.1 to 7 parts by weight of difunctional silane of the formula $$R(CH_3)Si\ Y_2$$

in which R is a monovalent substituted or unsubstituted hydrocarbon having from 1 to 6 carbon atoms, Y is selected from the group consisting of urea radicals of the formula

and of urethane radicals of the formula

where R''' is an organic radical selected from the group consisting of methyl, ethyl, propyl, and butyl, and $R^{iv}$ is a radical selected from the group consisting of hydrogen, methyl, ethyl, propyl, butyl, and phenyl.

The difunctional ureasilane can be prepared by reacting a diorganodichlorosilane with an amine to produce a diorganodiaminosilane, then reacting with an isocyanate to yield a diorganodiureasilane. For example, $(CH_3)_2SiCl_2+2\ HN(CH_3)_2$ yields $(CH_3)_2Si(N(CH_3)_2+2\ HCl$. Then $(CH_3)_2Si(N(CH_3)_2)_2+2\ HN(CH_3)C(O)H$ yields $(CH_3)_2Si(N(CH_3)C(O)N(CH_3))_2+2\ H_2$.

The difunctional urethanesilane can be prepared by reacting a diorganodichlorosilane with an amine to produce a diorganodiaminiosilane, then converting to a diorganodiurethanesilane by reaction with carbon dioxide in a manner analogous to that shown in U.S. Pat. No. 3,284,485, issued Nov. 8, 1966, incorporated by reference to show the preparation of the difunctional urethanesilane. For example, $(CH_3)_2Si(N(CH_3)_2)_2 + CO_2$ yields $(CH_3)_2SiOC(O)N(CH_3)CH_3$.

The difunctional ureasilane and urethanesilane are used in the same amounts as for the diacetamidosilane discussed above.

The composition is crosslinked by the addition of from 0.1 to 7 parts by weight, per 100 parts by weight of (A), of tetra functional silane (C) of the formula

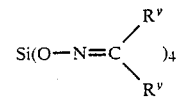

where $R^v$ is a radical selected from the group consisting of methyl, ethyl, propyl, butyl, phenyl, and hydrogen. The preferred tetraoximino functional silane is tetra(methylethylketoximino)silane of the formula

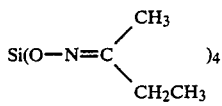

The tetraoximinsliianes are best prepared by mixing an oxime with a tetrahalosilane, preferably a tetrachlorosilane, in the presence of an acid acceptor such as pyridine and distilling the fluid products. The method of manufacture is further discussed in U.S. Pat. Nos. 3,189,576, issued June 15, 1965, and 4,400,527, issued Aug. 23, 1983, both of which are incorporated by reference to show oximinosilanes and their method of manufacture.

A trioximino functional silane similar to the above tetraoximinosilane can be used as part or all of the crosslinker, but the reaction rate is much slower for the tri functional silane as compared to the tetra functional silane. The tetra functional silanes are preferred for this reason.

The amount of tetraoximinosilane is preferably from 2 to 4 parts by weight. The ratio of diacetamido functional silane (B) to tetraoximinosilane (C) is from 0.1 to 3. The ratio of diacetamido functional silane (B) to tetraoximinosilane (C) preferably is from 0.5 to 1.75, with the most preferred ratio being about 1.3 to 1.5. When the ratio of (B) to (C) was too high, the composition did not cure. When the ratio was too low, the composition cured in the tube, that is it did not have a reasonable shelf life.

The compositions of this invention may contain from 0 to 150 parts by weight of non-acidic, non-reinforcing filler having an average particle size of from 0.5 to 8 micrometers per 100 parts by weight of hydroxyl endblocked polydiorganosiloxane. The fillers are non-acidic, non-reinforcing filler and include for example, calcium carbonate, ferric oxide, diatomaceous earth, alumina, hydrated alumina, titanium dioxide, glass microballons, organic fillers, resins such as silicone resins, crushed quartz, calcium sulfate, and the like. A preferred filler is calcium carbonate having an average particle size of less than 4 micrometers.

If desired, the composition of this invention can be made self-leveling by use of a mixture of treated and untreated filler. To obtain self leveling, from 95 to 5 percent by weight of the filler is present as untreated filler, and from 5 to 95 percent by weight of the filler is present as treated filler, along with from 1 to 50 percent by weight of a diluent, based upon the weight of the total composition. If from 40 to 100 percent of the filler is treated, a self leveling filler can be produced without the use of diluent.

A treated filler which has been found to be particularly suitable for use in producing a sealant is calcium carbonates treated with a treating agent selected from the group consisting of calcium stearate and stearic acid. The filler is treated with the treating agent by either coating or reacting the filler with the treating agent. Treated fillers are commercially available, such as the calcium carbonate filler treated with calcium stearate that is known as CS-11 from Georgia Marble Company of Tate, Ga., and Kotamite from Cyprus Industrial Minerals Company of Englewood, Colo.

Other conventional additives can be used so long as they are neutral or basic, including pigments, dyes, antioxidants, heat stability additives, and the like.

The compositions are preferably made by mixing the hydroxyl containing polydiorganosiloxane and filler, if used, to make a homogeneous mixture with the filler well dispersed. A suitable mixture can usually be obtained in one hour using commercial mixers. The resulting mixture is preferably deaired and then a mixture of the difunctionalsilane (B) and tetrafunctionalsilane (C) is added and mixed with the polymer and filler mixture, not allowing contact with the moisture in the air. This mixing is done under essentially anhydrous conditions and then the resulting composition is put into containers for storage under essentially anhydrous conditions. Once one package compositions are made, they are stable, that is they do not cure, if the essentially moisture free conditions are maintained; but will cure to low modulus silicone elastomers when exposed to moisture at room temperature. Although the present compositions are designed as one package compositions, the components could be packaged in two or more packages, if desired.

The compositions of the present invention do not require a catalyst to aid in curing the composition. It is observed that many of the conventional curing catalysts used in room temperature vulcanizable silicone elastomer compositions are detrimental to the curing of the compositions, particularly those based upon titanium.

The compositions of this invention can be compounded to produce useful sealants and adhesives which can be one part compositions which are stable in the absence of moisture, but cure to elastomers upon exposure to moisture.

The following examples are included for illustrative purposes only and should not be construed as limiting the invention which is properly set forth in the appended claims.

EXAMPLE 1

A silicone elastomer base was prepared by mixing together 2000 g of hydroxyl endblocked polydimethylsiloxane fluid having a viscosity of about 50 Pa.s at 25° C. and a hydroxyl content of about 0.057 weight percent, 452 g of trimethylsilyl endblocked polydimethylsiloxane having a viscosity of about 12.5 Pa.s at 25° C., and 1596 g of calcium stearate treated calcium carbonate filler having an average particle size of about 3 micrometers. After mixing until uniform, the base was placed in a number of sealant tubes containing mixing blades and then sealed until further processed.

A series of moisture curable compositions were then prepared by mixing in the above bases, without exposure to moisture, various amounts of difunctional silane (B) consisting of about 80 percent by weight of methylvinyldi(N-methylacetamido)silane with the remaining 20 percent being impurities consisting primarily of methyl-N-methylacatamide, di(methylvinyl-N-acetamido)methylvinylsilane, and xylene, and various amounts of tetramethylethyloximosilane (C), in the form of a 50 percent solution in toluene, as shown in Table I. After mixing without exposure to moisture for ten minutes to give a uniform mixture, the sealed tubes were subjected to an accelerated aging period by storing for one week at 50° C. This is thought to approximate 1 year storage at room temperature.

Then the sealants were evaluated for physical properties, with the results shown in Table I. The skin over time (SOT) is defined as the time required for the material to cure to the point where it no longer adheres to a clean fingertip lightly applied to the surface. The cure conditions are 23° C. and 50 percent relative humidity. Portions of each sealant were spread out between spacers to make a sheet about 0.75 inch thick and allowed to cure for a period of 7 days at 77° F. and 50 percent relative humidity. Test specimens were cut from the cured sheets and the ultimate tensile strength, modulus of 100 percent elongation, and ultimate elongation at break were measured in accordance with ASTM D 412.

TABLE I

| Sample | (B) parts | (C) parts | Ratio B/C | SOT min. | Tensile psi | Modulus psi | Elongation percent |
|---|---|---|---|---|---|---|---|
| 1 | 0.5 | 1.1 | 0.44 | | cured in the tube | | |
| 2 | 0.5 | 1.75 | 0.28 | 5 | 69 | 55 | 223 |
| 3 | 0.5 | 2.0 | 0.24 | 5 | 76 | 62 | 228 |
| 4 | 1.5 | 1.1 | 1.32 | 369 | >68 | 18 | >1430 |
| 5 | 1.5 | 1.75 | 0.86 | 70 | 63 | 23 | 970 |
| 6 | 1.5 | 2.0 | 0.76 | 43 | 73 | 25 | 987 |
| 7 | 2.5 | 1.1 | 2.2 | | did not cure | | |
| 8 | 2.5 | 1.75 | 1.42 | 51 | >51 | 19 | >1420 |
| 9 | 2.5 | 2.0 | 1.24 | 780 | >47 | 15 | >1370 |
| 10 | 4.0 | 1.75 | 2.2 | | did not cure | | |
| 11 | 4.0 | 2.0 | 2.0 | | did not cure | | |
| 12* | 2.8 | # | — | 353 | >48 | 18 | >1600 |

*control, contained # 1.6 parts of aminoxy-functional silane, N,N-diethylaminoxypolysiloxane, of the formula Me₃SiO(SiO)₃(SiO)₅SiMe₃ with Me, Me, Me, O-NEt₂ substituents where Me is methyl and Et is ethyl Sealant samples 4 and 8, as well as control sample 12 were used to bond pieces of concrete together and pieces of asphalt together. The bond was tested after 21 days at room temperature, then after 7 days immersion in water, and after an additional 10 cycles of extension of the bond 100 percent and compression of 50 percent. The bond was tested by flexing the two pieces so that the joint was subjected to a 60 degree bend. In no case was there a failure of the bond to either concrete or asphalt.

EXAMPLE 2

A similiar set of samples was prepared as above, but from 2.25 to 4.0 parts of methyltrioximosilane was used in place of the tetraoximosilane. In all cases the sealant cured too slowly upon exposure to moisture to be of practical use.

That which is claimed is:

1. A silicone composition which is stable in the absence of moisture and which cures upon exposure to moisture to give an elastomer consisting essentially of the product obtained
  (A) 100 parts by weight of hydroxyl containing polydiorganosiloxane having a viscosity of from 10 to 100 Pa.s at 25° C., the organo groups being selected from the group consisting of monovalent substituted or unsubstituted hydrocarbons having from 1 to 6 carbon atoms,
  (B) from 0.1 to 7 parts by weight of diacetamido functional silane of the formula

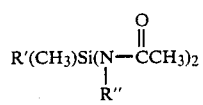

in which R' is an organic radical selected from the group consisting of methyl and vinyl and R" is an organic radical selected from the group consisting of methyl, ethyl, propyl, butyl, and phenyl, and
  (C) from 0.1 to 7 parts by weight of tetraoximino functional silane of the formula

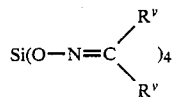

where Rᵛ is a radical selected from the group consisting of methyl, ethyl, propyl, butyl, phenyl, and hydrogen, the ratio of (B) to (C) being from 0.1 to 3.

2. The composition of claim 1 in which the hydroxyl containing polydiorganosiloxane is hydroxyl endblocked polydimethylsiloxane.

3. The composition of claim 2 in which the viscosity of the hydroxyl endblocked polydimethylsiloxane is from about 30 to 70 Pa.s at 25° C.

4. The composition of claim 3 in which (B) is from 1 to 3.5 parts by weight of methylvinyldi-(N-methylacetamido)silane.

5. The composition of claim 3 in which (C) is from 2 to 4 parts by weight of tetra(methylethylketoximino)silane.

6. The composition of claim 4 in which (C) is from 2 to 4 parts by weight of tetra(methylethylketoximino)silane.

7. The composition of claim 6 in which there is from 1 to 150 parts of non-acidic, non-reinforcing filler.

8. The composition of claim 1 in which the ratio of diacetamido functional silane (B) to tetraoximino functional silane (C) is from 0.5 to 1.75.

9. The composition of claim 1 in which the ratio of diacetamido functional silane (B) to tetraoximino functional silane (C) is about 1.3 to 1.5.

10. A silicone composition which is stable in the absence of moisture and which cures upon exposure to moisture to give an elastomer consisting essentially of the product obtained by mixing
  (A) 100 parts by weight of hydroxyl endblocked polydiorganosiloxane having a viscosity of from 10 to 100 Pa.s at 25° C., the organo groups being selected from the group consisting oi monovalent substituted or unsubstituted hydrocarbons having from 1 to 6 carbon atoms,
  (B) from 0.1 to 7 parts by weight of difunctional silane of the formula R(CH₃)Si Y₂ in which R is a monovalent substituted or unsubstituted hydrocarbon having from 1 to 6 carbon atoms, Y is selected from the group consisting of radicals of the formula

and of the formula

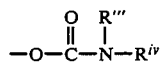

where R''' is an organic radical selected from the group consisting of methyl, ethyl, propyl, and butyl, and $R^{iv}$ is a radical selected from the group consisting of hydrogen, methyl, ethyl, propyl, butyl, and phenyl, and (C) from 0.1 to 7 parts by weight of tetraoximino functional silane of the formula

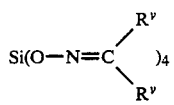

where $R^v$ is a radical selected from the group consisting of methyl, ethyl, propyl, butyl, phenyl, and hydrogen, the ratio of (B) to (C) being from 0.1 to 3.

11. The composition of claim 10 in which (B) is a diureasilane of the formula

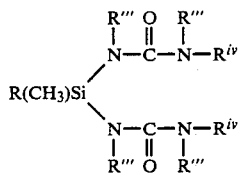

12. The composition of claim 10 in which (B) is a diurethane radical of the formula

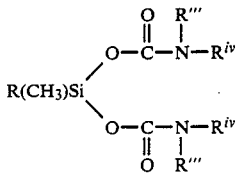

13. The composition of claim 10 in which (B) is of the formula

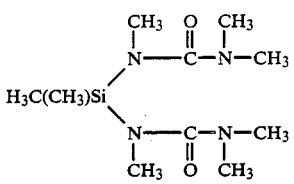

14. The composition of claim 10 in which (B) is of the formula

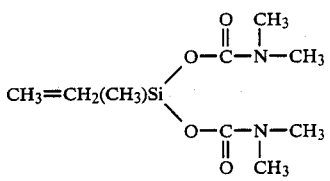

* * * * *